United States Patent [19]

Dhein

[11] Patent Number: 5,128,754
[45] Date of Patent: Jul. 7, 1992

[54] APPARATUS AND METHOD FOR ENCODING AND DECODING VIDEO
[75] Inventor: Robert Dhein, Fort Lauderdale, Fla.
[73] Assignee: New York Institute of Technology, Old Westbury, N.Y.
[21] Appl. No.: 502,519
[22] Filed: Mar. 30, 1990
[51] Int. Cl.$^5$ .................... H04N 7/18; H04N 7/12
[52] U.S. Cl. ................... 358/105; 358/135; 358/136; 358/140
[58] Field of Search ............ 358/105, 135, 136, 140, 358/141, 11, 12

[56] References Cited

U.S. PATENT DOCUMENTS

| | | | |
|---|---|---|---|
| 4,196,448 | 4/1980 | Whitehouse et al. | 358/135 |
| 4,210,931 | 7/1980 | Bailey et al. | 358/128.5 |
| 4,224,678 | 9/1980 | Lynch et al. | 364/724 |
| 4,302,775 | 11/1981 | Widergren et al. | 358/136 |
| 4,394,774 | 7/1983 | Widergren et al. | 382/56 |
| 4,517,597 | 5/1985 | Glenn | 358/141 |
| 4,541,012 | 9/1985 | Tescher | 358/133 |
| 4,605,952 | 8/1986 | Powers | 358/13 |
| 4,628,344 | 12/1986 | Glenn | 358/12 |
| 4,630,099 | 12/1986 | Rzeszewski | 358/12 |
| 4,652,909 | 3/1987 | Glenn | 358/41 |
| 4,661,849 | 4/1987 | Huiman | 358/105 |
| 4,661,862 | 4/1987 | Thompsoon | 358/335 |
| 4,672,425 | 6/1987 | Marie et al. | 358/12 |
| 4,675,733 | 6/1987 | Tanimoto | 358/138 |
| 4,675,750 | 6/1987 | Collins et al. | 360/9.1 |
| 4,701,783 | 10/1987 | Glenn | 358/12 |
| 4,729,012 | 3/1988 | Jose et al. | 358/12 |
| 4,729,021 | 3/1988 | Kondo | 358/135 |
| 4,745,458 | 5/1988 | Hirano et al. | 358/105 |
| 4,745,474 | 5/1988 | Schiff | 358/105 |
| 4,774,562 | 9/1988 | Chen et al. | 358/13 |
| 4,780,760 | 10/1988 | Waldman et al. | 358/105 |
| 4,780,761 | 10/1988 | Daly et al. | 358/133 |
| 4,791,598 | 12/1988 | Liou et al. | 364/725 |
| 4,800,426 | 1/1989 | Glenn | 358/141 |
| 4,807,029 | 2/1989 | Tanaka | 358/133 |
| 4,821,119 | 4/1989 | Gharavi | 358/136 |
| 4,845,560 | 7/1989 | Kondo et al. | 358/105 |
| 4,845,562 | 7/1989 | Koslov et al. | 358/141 |
| 4,851,906 | 7/1989 | Koga et al. | 358/133 |
| 4,870,489 | 9/1989 | Ducret | 358/140 |
| 4,873,573 | 10/1989 | Thomas et al. | 358/133 |

OTHER PUBLICATIONS

W. Glenn, K. Glenn, C. Bastian, "Imaging System Design Based On Psychophysical Data", Proc. of SID, vol. 26/1, pp. 71-78 (1985).
"Visual Pschological Factors As Applicable To The Design and Development Of Video Systems For Use In Space", NYIT Final Rept. To NASA, (May 1989).
R. C. Gonzales et al., "Digital Image Processing" Addison-Wesley, pp. 80-83 (1987).
E. Dubois et al. "Three Dimensional Spectrum And Processing Of Digital NTSC Color Signals", SMPTE J. (Apr. 1982).
B. Wendlund et al. "On Picture Quality of Some TV Signal Processing Techniques", SMPTE J. (Oct. 1984).
W. E. Glenn, "HDTV Compatible Transmission System", National Association of Broadcasters, Apr., 1986.
W. E. Glenn, "Compatible Terrestrial HDTV Transmission", NAB Engineering Conference Proceedings, Apr., 1986.
M. A. Isnardi et al., "Advanced Compatible Television, A Progress Report" SMPTE Journal, Jul., 1989.
W. F. Schreiber, "Improved Television Systems: NTSC and Beyond" SMPTE Journal, Aug., 1987.
W. F. Schreiber, "Psychophysics and the Improvement of Television Image Quality" SMPTE Journal, Aug., 1984.
R. Scott, "Data Compression Putting On The Squeeze" True Imaging, Mar., 1989.
W. F. Schreiber et al., "Reliable EDTV/HDTV Transmission in Low-Quality Analog Channels" SMPTE Journal, Jul., 1989.

*Primary Examiner*—John K. Peng
*Attorney, Agent, or Firm*—Martin Novack

[57] ABSTRACT

A method and an apparatus are disclosed for encoding and decoding video to achieve bandwidth compression. In one embodiment, frames of a video signal are divided into a multiplicity of tiles. The picture content of each tile is separated into a plurality of frequency bands having a predetermined priority order. Motion is determined at each tile from changes in picture content of the tile from frame to frame. Signals are generated for each frame, the signals including an indication of the motion status for each tile and a representation of a frequency band for each tile. The frequency band representation for each particular tile is selected as a function of the motion status for the particular tile.

29 Claims, 12 Drawing Sheets

△ OGILVIE & TAYLOR

○ MEAN INDEX FROM "VISUAL DISCRIMINATION & ORIENTATION" J. OPT. SOC. AM., VOL. 53, PP. 763-765

□ W. E. GLENN

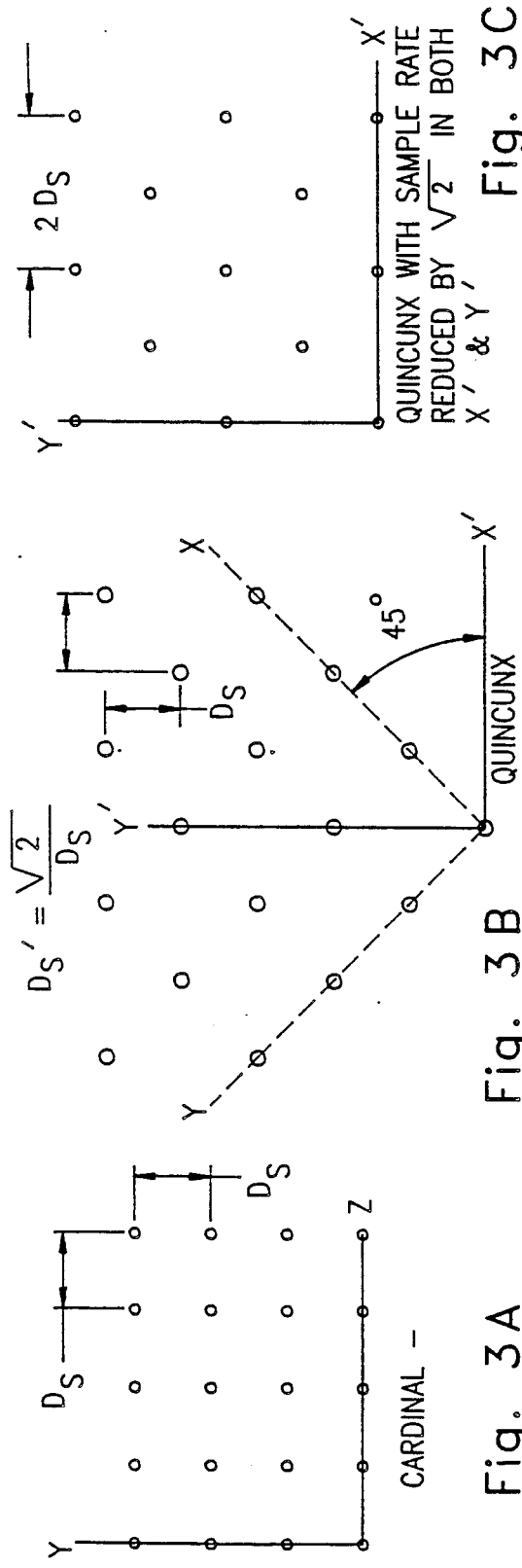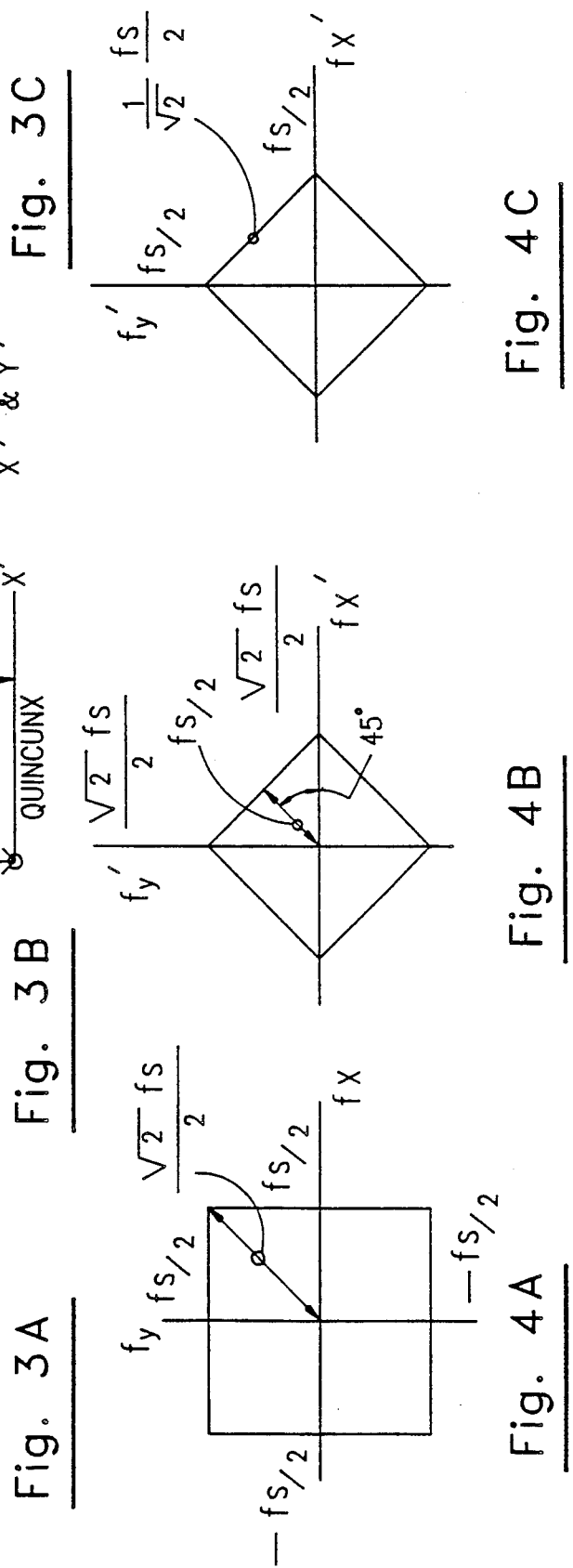

APPARATUS AND METHOD FOR ENCODING AND DECODING VIDEO

BACKGROUND OF THE INVENTION

This invention relates to video signals and, more particularly, to apparatus and method for encoding and decoding video signals for use in high definition television systems as well as in other applications including storage and/or transmission, over any suitable medium, of moving images in a form that requires reduced storage capacity and/or reduced bandwidth channels. The techniques hereof can be employed, for example, in so-called "compatible" high definition television approaches that use a separate auxiliary or "augmentation" channel to send picture detail information that augments conventionally received television information to obtain high definition performance, as well as in so-called "simulcast" approaches wherein a complete and independent high definition television signal is sent, on a separate channel, simultaneously with a conventional transmission of the same program information. Some of the techniques hereof can also be employed in so-called "enhanced definition" approaches that send picture enhancement information (but less than the information needed for full high definition performance) on the same channel with a conventional television program.

As high definition television (HDTV) becomes more prevalent, improved systems are needed for transmission and reception of the additional information required for presenting HDTV images. Any new service which provides higher definition television than is conventionally broadcast (i.e., more elements per line and lines per frame, and thus a wider bandwidth necessary for transmission) should serve existing home television receivers with essentially all the picture attributes and quality of which the receivers are capable. Also, receivers designed for new (high definition) service, should be capable of operating using the pre-existing transmissions and derive from them a result not inferior to that provided by pre-existing receivers.

A variety of HDTV schemes have been proposed. In U.S. Pat. Nos. 4,517,597, 4,628,344, 4,652,909, 4,701,783, and 4,800,426, assigned to the same assignee as the present application, as well as in the publication "HDTV Compatible Transmission System", W. E. Glenn, National Association of Broadcasters, April, 1986, there is disclosed an HDTV system that utilizes an augmentation approach which permits compatible transmission of HDTV. The disclosed techniques also have application to video bandwidth compression and to reducing video storage capacity.

As described in the referenced patents and publication, an electronic video signal (e.g. a television signal) can be encoded at reduced bandwidth by lowering the frame refresh rate of the high spatial frequency components, while maintaining the frame refresh rate of at least a portion of the low spatial frequency components at the standard rate. If done in a specified manner this will not cause substantial degradation in the ultimately displayed image, since human vision cannot perceive changes in high spatial resolution information at as fast a rate as it can perceive changes in low spatial resolution information. Accordingly, as has been previously set forth, an electronic video encoding and decoding system can be devised which takes advantage of this, and other, characteristics of human vision by encoding higher spatial resolution video components to be at a temporal information rate which approximately corresponds to the highest rate actually perceived by human vision for such components; thereby eliminating the need to encode these components at a higher rate, which inherently wastes bandwidth. Also, as shown in referenced patent and publication, the low spatial resolution information can be generated in a form which is compatible with standard television video, for example NTSC video used in the U.S. It has also been recognized that a number of frequency components can be transmitted at specified rates [see e.g. W. F. Schreiber et al., Reliable EDTV/HDTV Transmission In Low Quality Analog Channels, SMPTE Journal, July 1989, and the abovereferenced patents of the present assignee], with components selected according to degree of motion in order to have higher spatial resolution in scenes with little motion and higher temporal resolution in scenes with a great deal of motion.

FIG. 1 illustrates a compatible high definition television transmission and receiving system of the general type described in the above-referenced patents and publication. A transmitter 200 includes NTSC processing circuitry 210 which processes television signals from a source such as a television camera system (not shown) or a video recording system (not shown). The circuitry 210 is coupled to transmitting circuitry 215, which typically includes modulation circuitry and other suitable circuitry for producing a signal to be transmitted over a standard NTSC channel. The television signals from the television camera system or video recorder (which is assumed to have a high definition video capability) are also processed by high definition television (HDTV) processing circuitry 260 which produces detail signals that can be utilized to enhance conventional television signals to obtain HDTV signals, as described in the abovereferenced patents and publication. [As further described in the referenced U.S. Pat. No. 4,652,909, the detail signal can be obtained from a separate camera.] The detail signals are coupled to further circuitry 275, which transmits the detail signal over a second (auxiliary) channel that is typically not adjacent to the (main) NTSC channel used for transmission of the standard portion of the television information. The NTSC signal is received by receivers such as receiver 310 which has only a capability of producing a television picture at substantially conventional resolution e.g. conventional display 315. Receivers such as receiver 360, which have a capability for receiving, processing, and displaying high definition television signals, receive both the main channel carrying the NTSC signal and the auxiliary channel carrying the detail signals to be used for augmentation of the NTSC video signal so as to produce a high definition television signal for display on an HDTV display 365.

In the referenced patents and publication, the spatial detail is transmitted at a relatively slow frame rate, such as 15 or 7.5 frames per second. "Jutter" (jerky edge motion) was observed when the detail frame rate was reduced too far. This artifact constrains the augmentation channel bandwidth to be larger than would otherwise be indicated by psychophysical studies. Camera lag, caused by the integration of image energy on the face of the camera tube, which attenuates detail in moving areas of the picture, can be exploited to reduce jutter, but some reduction in image detail can be observed in moving objects when they are visually tracked.

It is among the objects of the present invention to provide improvements in performance and in bandwidth compression with respect to the techniques described above and with respect to other prior art techniques. It is also among the objects hereof to provide such improvements in a system that can be made compatible with existing or future television standards (for example, NTSC, or other standards such as PAL or SECAM).

As further background to the invention, reference can be made to the following U.S. Patents which relate to compression, transmission and/or other processing of video signals and/or still picture information:

U.S. Pat. Nos. 4,196,448, 4,210,931, 4,224,678, 4,302,775, 4,394,774, 4,541,012, 4,605,952, 4,630,099, 4,661,862, 4,672,425, 4,675,733, 4,675,750, 4,729,012, 4,774,562, 4,780,761, 4,791,598, 4,807,029, 4,821,119, 4,845,562, 4,851,906, 4,870,489, 4,873,573.

BRIEF DESCRIPTION OF THE DRAWINGS

FIGS. 3A, 3B and 3C respectively illustrate cardinal sampling, quincunx sampling, and quincunx sampling with reduced sampling rate.

FIGS. 4A, 4B and 4C respectively illustrate spectra for the FIG. 3A, 3B and 3C situations.

DESCRIPTION OF THE PREFERRED EMBODIMENT

Figure 2:
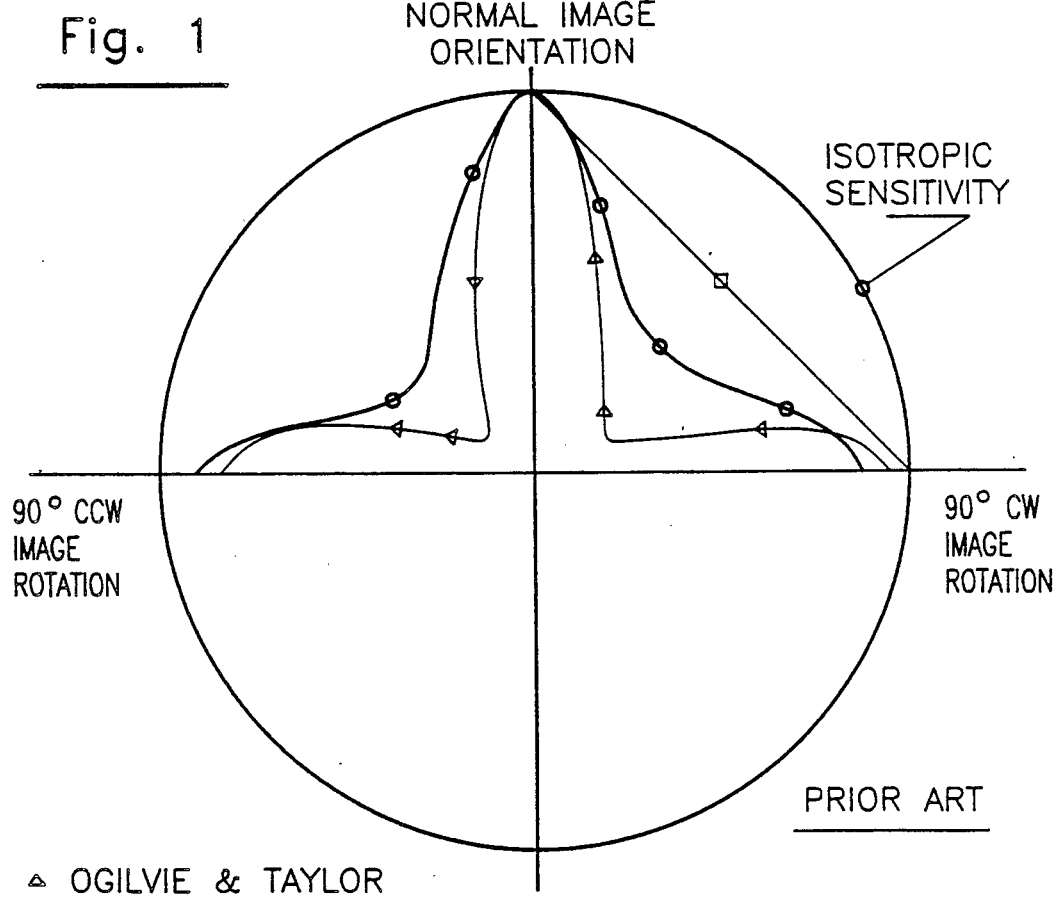
FIG. 2 is a polar illustrating data that measures the oblique effect.
Figure 5:
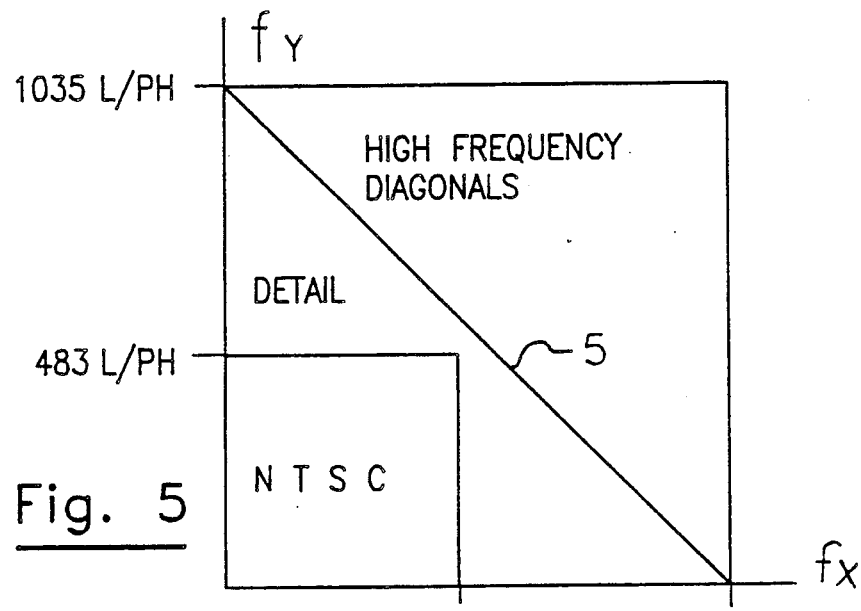
FIGS. 5 and 6 illustrate spectra referred to in the description.
Figure 6:
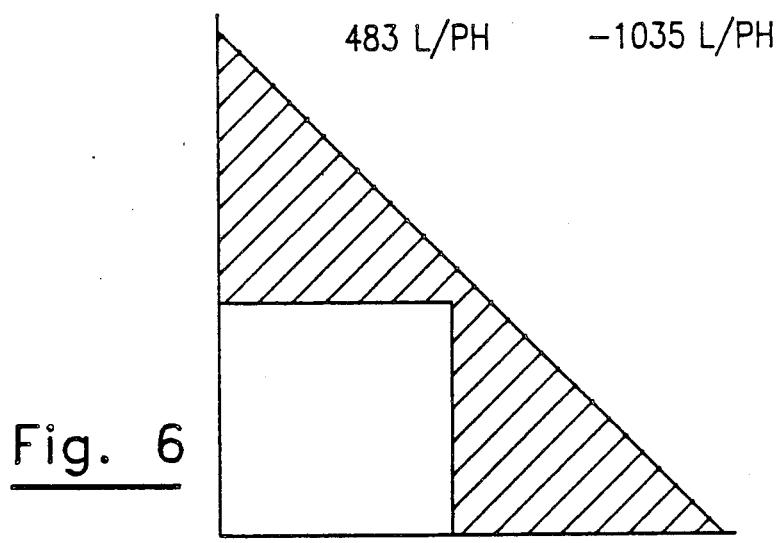

Subjective vision studies have indicated that perceived resolution is anisotropic (not equally precise in all directions). The eye is more sensitive to detail along the horizontal and vertical axes than to that along diagonals. [See, for example, W. E. Glenn et al., "Imaging System Design Based On Psychophysical Data," Proc. of the SID, Vol 26/1, pp. 71-78, Jan. (1985); NYIT STRC "Visual Psychophysical Factors as Applicable to the Design and Development of Video Systems for Use in Space, Final Report," NASA Report, May (1989); G. C. et al., "Variation of Visual Acuity with Various Test-Object Orientations and Viewing Conditions," J. Opt. Soc. Am. 40, pp. 135-137 (1950); F. W. Campbell et al., "Orientational Selectivity of the Human Visual System," J. Physiol., 187, pp. 437-445, (1966); and S. Appelle, "Perception and Discrimination as a Function of Stimulus Orientation: The "Oblique Effect" in Man and Animals," Psychological Bulletin, Vol. 78, No. 4, pp. 266-278, (1972).] FIG. 2 illustrates this oblique effect, plotted in polar form, as characterized by various researchers. While results differ somewhat due to the different types of testing employed, the curves of subjective resolution have a similar shape and diverge from the isotropic resolution shown by the outer circle. It is known that bandwidth and display element density can be reduced by taking advantage of the anisotropic spatial response characteristics of the visual system. FIGS. 3A, 3B and 3C respectively illustrate cardinal sampling, quincunx (or diagonal) sampling, and quincunx sampling with reduced sampling rate. FIGS. 4A, 4B and 4C show the respective discrete spectra for the sampling of FIGS. 3A, 3B and 3C, where $f_s = 1/D$. The quincunx sampling shown in FIGS. 3B and 3C results in the rotation of the spectral coordinate axes by 45 degrees [see, for example, R. C. Gonzales et al., Digital Image Processing, Reading Mass., Addison-Wesley (1987); E. Dubois et al., "Three-Dimensional spectrum and Procession of Digital NTSC Color Signals," SMPTE Journal, pp. 372-378, April (1982); and B. Wendland et al. "On Picture Quality of Some Television Signal Processing Techniques," SMPTE Journal, pp. 915-922, Oct., (1984)], thereby more closely matching the characteristics of vision. This method can be used to reduce the information content by a factor of two without degradation in perceived image quality. Half tone prints and, more recently, CCD cameras and LCD displays are successfully utilizing this technique. Some of the systems described in the patents referenced in the Background portion hereof utilized quincunx sampling to reduce the sampling rate, and therefore the augmentation bandwidth, by a factor of two. In an embodiment to be described, information content is reduced by eliminating high diagonal frequency components approximately to the upper right of the diagonal line 5 in the discrete spectral domain illustrated in FIG. 5. The NTSC spectrum is illustrated approximately in the lower lefthand box of FIG. 5. For an augmentation system wherein the NTSC spectral portion will be available from a conventional channel, the approximate remaining spectrum, to be considered for transmission on the augmentation channel, is shown in the shaded region of FIG. 6.

Figure 7:
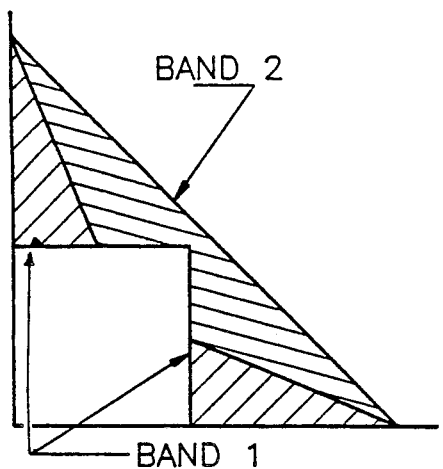
FIGS. 7 and 8 illustrate exemplary band divisions of the FIG. 6 spectrum.
Figure 8:
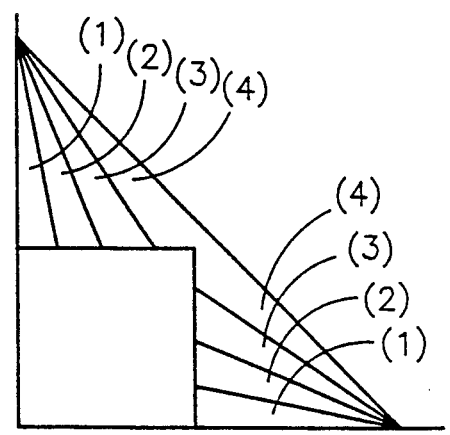

It is known that pictures can alternatively be represented in terms of their spectral content. The discrete Fourier transform of an entire image having N spatial pixels will contain N unique frequency components and therefore generally requires the same transmission bandwidth needed to send spatial image information. In the embodiment to de described, spectrally transforming the augmentation detail can provide advantages, for example because the lower spectral components usually sent in the conventional channel need not be duplicated, and the transformed augmentation components can be dynamically selected in a manner which can better satisfy the needs of the human visual system. FIGS. 7 and 8 illustrate exemplary band divisions of the FIG. 6 spectrum into two and four bands, respectively. In FIG. 8, the bands have approximately equal spectral order, and are numbered in descending order of visual priority. A four band augmentation technique is set forth in the embodiment to be described, but other band selections (both as to the number of bands and the spectral shapes and apportionments thereof) can be employed.

Figure 1:
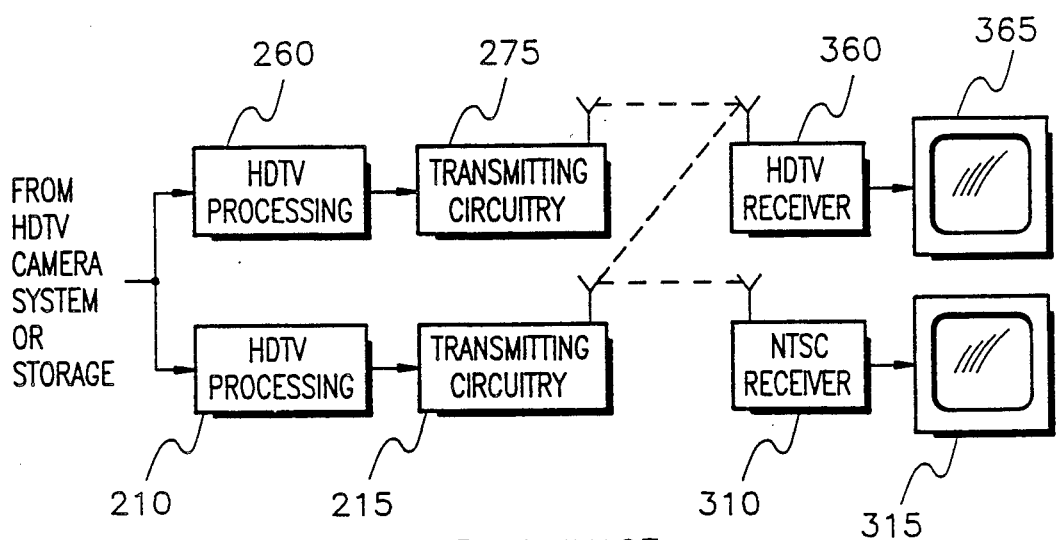
FIG. 1 is a simplified block diagram of a prior compatible high definition television system.
Figure 9:
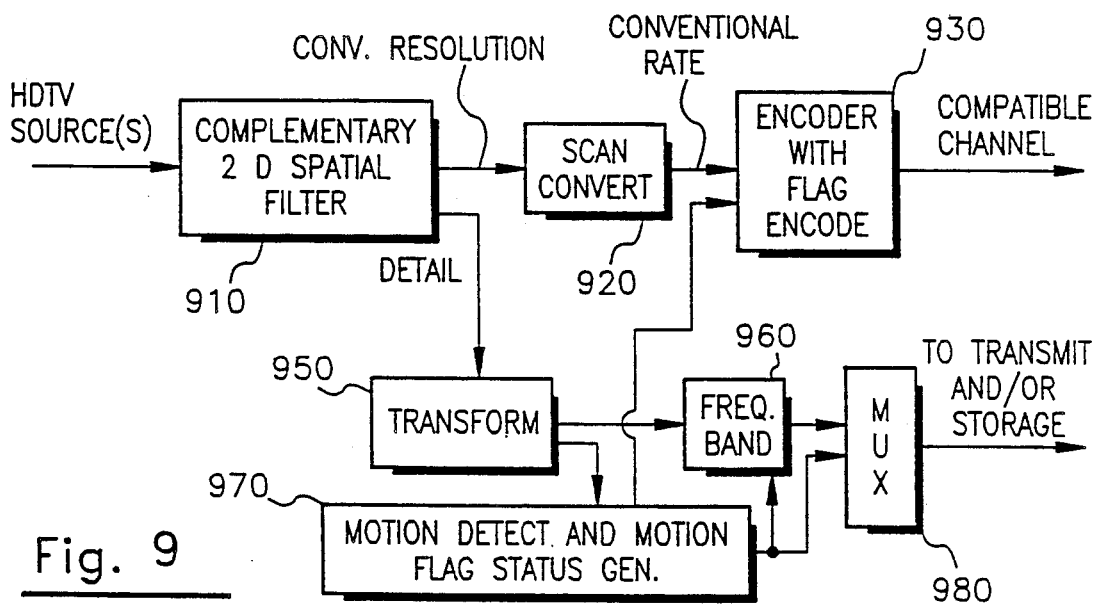
FIG. 9 is a block diagram of an encoder in accordance with an embodiment of the invention, and which can be used to practice an embodiment of method of the invention.

Referring to FIG. 9, there is shown a block diagram of an encoder in accordance with an embodiment of the invention, and which can be used to practice an embodiment of the method of the invention. The encoder may be utilized, for example, in the type of system illustrated in FIG. 1. The use of codes or synchronizing signals, or of other means for identifying or synchronizing channels, may be in accordance with the teachings of U.S. Pat. No. 4,800,426, or other abovereferenced patents or publications.

The high definition video signal is coupled to a complementary 2-dimensional spatial filter 910. The filter, described further in conjunction with FIG. 10, operates, inter alia, to separate the received HDTV signal into a conventional resolution video signal and a detail signal. The encoder spatial filter 910 can be in the form of two one dimensional low pass finite impulse response (FIR) filters—one operating in the vertical spatial direction cascaded with one operating in the horizontal spatial direction. The cascading operation acts to convolve the vertical and horizontal spatial images. The two dimensional spectral response is obtained by multiplying the responses of the two filters thereby providing a rectangular spectral window in the two dimensional frequency domain. Reference can also be made to the abovereferenced U.S. Pat. No. 4,628,344. [Of course, if separate high and low resolution cameras or other sources of video component signals are employed, the filtering may not be necessary or may be of a different form.] The conventional resolution video signal is coupled to a scan converter 920 which is utilized to produce video having conventional scanline and element format, for example 483 visible lines as in NTSC. The scan-converted video is coupled to encoder 930, for example an NTSC encoder. The encoded conventional resolution video signal can be stored, transmitted, or otherwise processed in known fashion. A motion-indicative signal can also be included in the conventional video channel in order to obtain enhanced operation at receivers having certain processing capabilities.

In the present embodiment, the high definition detail component is processed using predetermined regions (or "tiles") of the picture. In this embodiment, the tiles are square and there are 8×8 pixels per tile, although other tile sizes and configurations could be utilized.

The detail augmentation channel includes transformation of the detail signal using an orthogonal transform into the frequency domain, such as by cosine transform, as represented by the block 950. The particular transform bands to be utilized (transmitted, in this case) are dynamically selected as a function of motion for each tile, as represented by the blocks 960 and 970, and described further in conjunction with FIG. 11. In accordance with a feature of this embodiment, the particular bands selected are determined, for those tiles at which there is currently no substantial motion, as a function of the motion history of such tile. In particular, the longer the picture information at the tile remains substantially the same, the more detail information is provided (transmitted, in this case) for the tile, until all available detail has been provided. In the present embodiment, the motion indicative signals are generated by detecting motion of the transformed tiles (e.g. FIGS. 11 and 13), although it will be understood that motion could be detected using the detail component or other suitable video representation. The selected band components (if any) for each tile, and motion status signals are coupled, in the present embodiment, via multiplexer 980, to the transmitter and/or storage medium.

Figure 10:
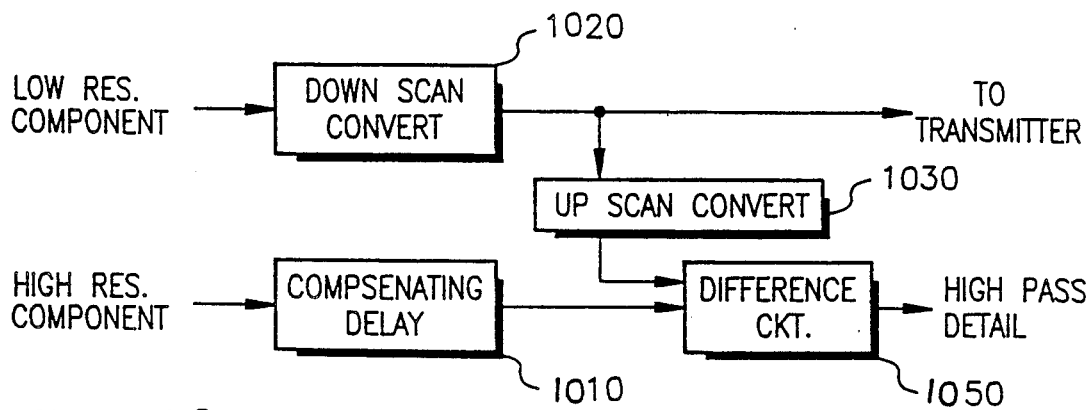
FIG. 10 is a block diagram of a system for encoder scan conversion.

FIG. 10 illustrates a preferred arrangement for the encoder scan conversion. The low (or conventional) resolution output of the 2D spatial filter 910 (e.g. at 1125 lines) can be coupled to a first down scan converter 1020 that converts to conventional 525 line (NTSC) format, for coupling to the conventional transmitter (e.g. 210 in FIG. 1). An up scan converter 1030, that is identical to one that will be employed in the receiver's decoder (e.g. block 1415 of FIG. 14 below), can then be used to up-convert back to 1125 lines. The result can be subtracted from the high resolution component, using difference circuit 1050, to obtain the desired high-pass detail components. A compensating delay 1010 can be employed, as shown, and throughout the description hereof it will be understood that any necessary compensating delays can be employed, as known in the art.

Figure 11:
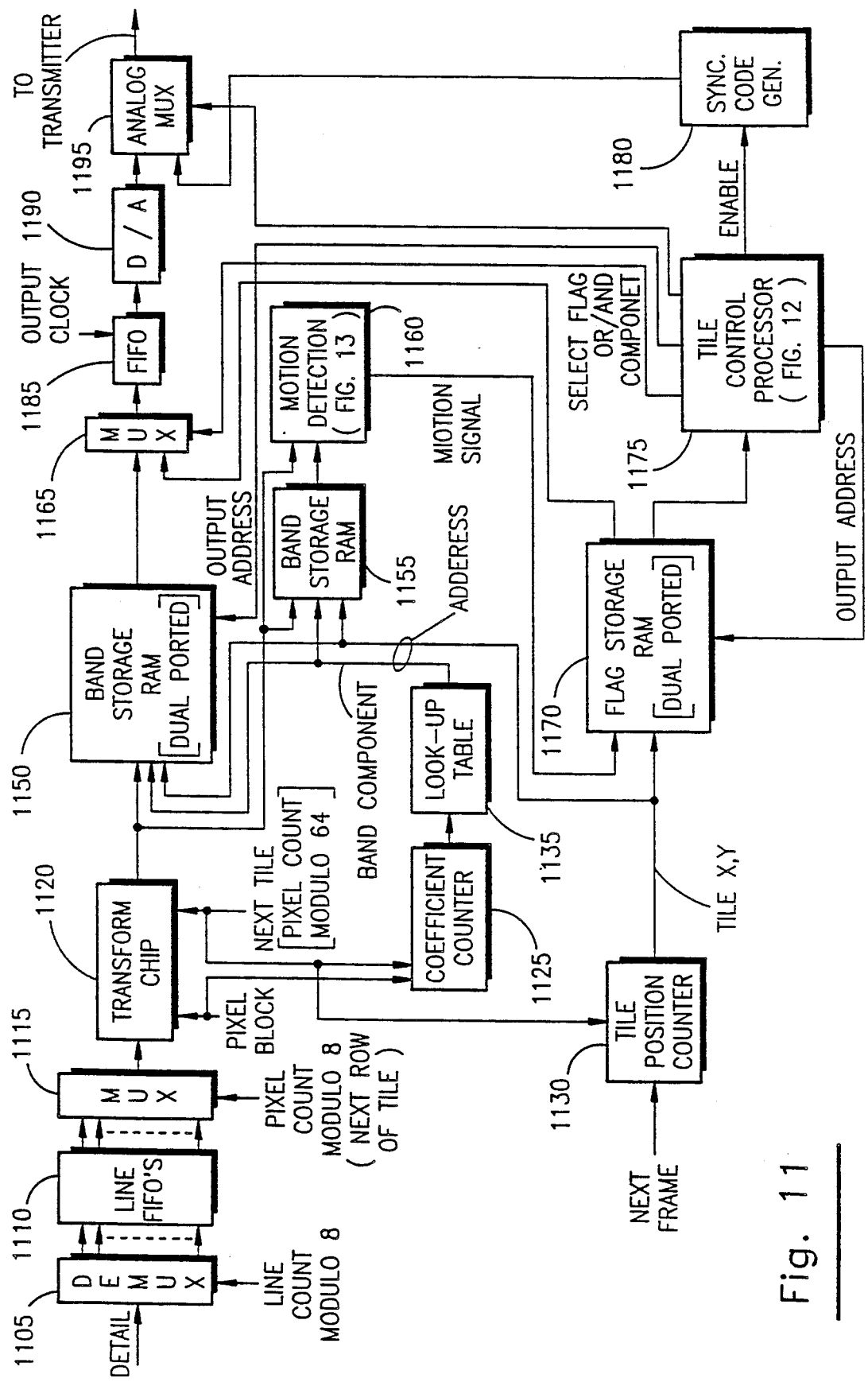
FIG. 11 is a block diagram of a portion of the encoder of the FIG. 9 embodiment.

Referring to FIG. 11, there is shown, in further detail, a block diagram of the portion of the encoder that processes the detail signal for coupling to the augmentation channel and which was represented in FIG. 9 by the blocks 950, 960, 970 and 980. A demultiplexer 1105, line fifos 1110 and multiplexer 1115 serve, in known fashion, to put the detail signal in appropriate format to be received by the transform chip 1120 which, in the present embodiment may be an INMOS IMS A121 Discrete Cosine Transform chip. The transform chip 1120 receives a pixel clock, which is also received by a coefficient counter 1125. The transform chip also receives a "next tile" indication, which can be derived as the pixel count modulo 64, and this indication is also coupled to the coefficient counter 1125 and to a tile position counter 1130. The tile position counter 1130 also receives a "next frame" indication. The coefficient counter 1125 keeps track of which of the transform coefficients (64 of them, for this example) is being output from the transform chip 1120, and the tile position counter 1130 keeps track of the position (x,y) of the tile being processed, the tiles typically being processed sequentially, a row at a time. A look-up table 1135, which may be a read-only memory ("ROM"), translates the coefficient identification information from counter 1125 to part of an address at which coefficients from transform chip 1120 are to be stored in two band storage RAMs 1150 and 1155, respectively. The band storage RAM 1150 is dual ported; that is, it can be accessed at either an input port, using and input address or, independently, at an output port using an output address (which, in this case, is obtained from a tile control processor 1175). The band storage RAM 1150 is used to store the band components; that is, the groups of transform coefficients that comprise individual bands of the frequency spectrum, such as the four bands labeled 1, 2, 3 and 4 in FIG. 7. In the present example it is assumed that each of the four bands, 1-4, has five coefficients, which that means that twenty of the possible sixty-four coefficients are actually utilized to represent the shaded spectrum shown in FIG. 6, the other forty-four coefficients approximately representing the remaining regions shown in FIG. 5, and not being necessary, as explained above. As will be explained, the appropriate band component will be read out of the band storage RAM 1150 to a multiplexer 1165 which also receives indications of motion flag storage status from the flag storage RAM 1170. These signals are applied to a fifo 1185 and eventually to a transmitter (or storage, as the case may be), such as transmitter 275 of FIG. 1.

Figure 12:
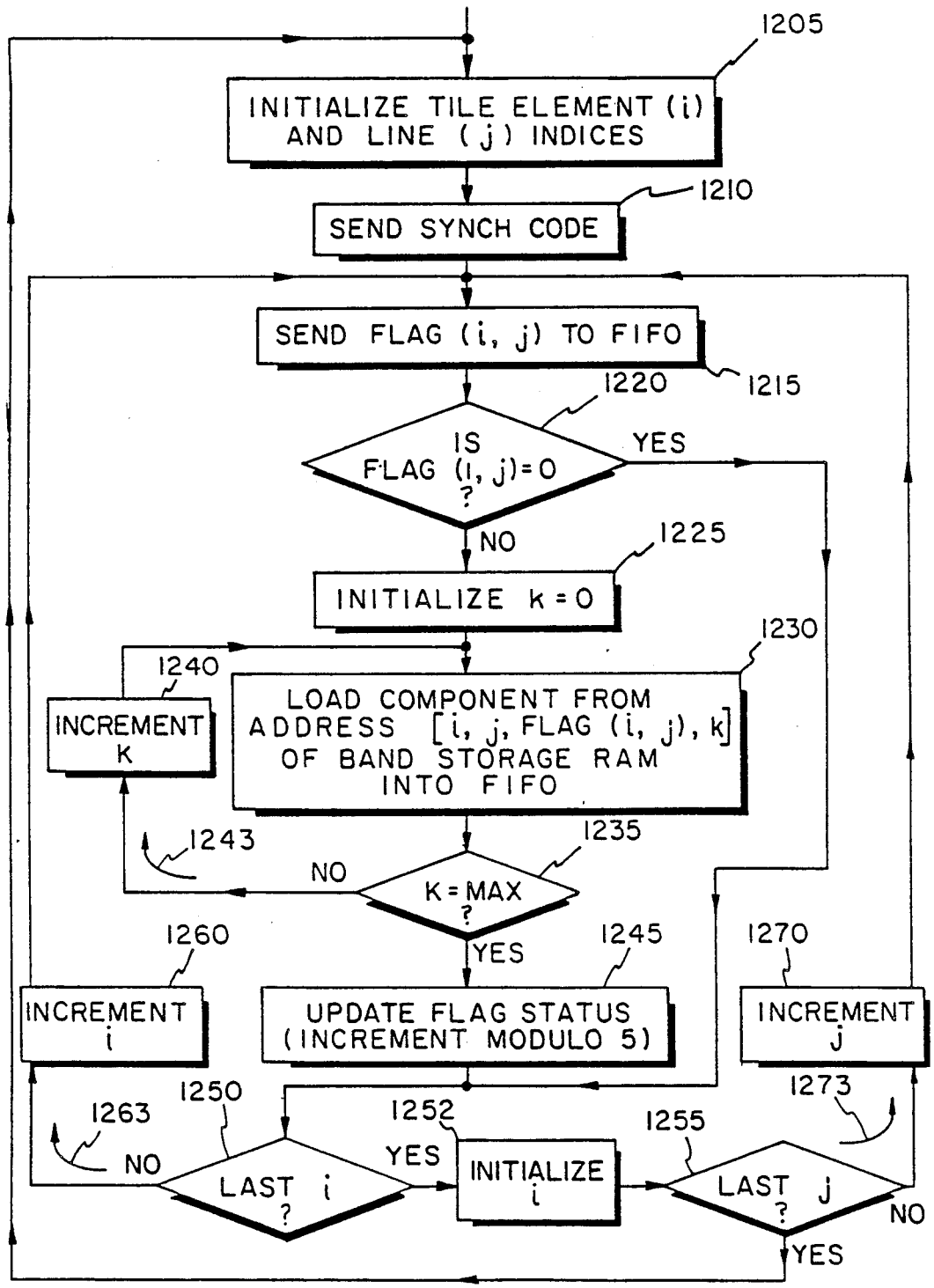
FIG. 12 is a flow diagram a routine for controlling the tile control processor of FIG. 11.
Figure 13:
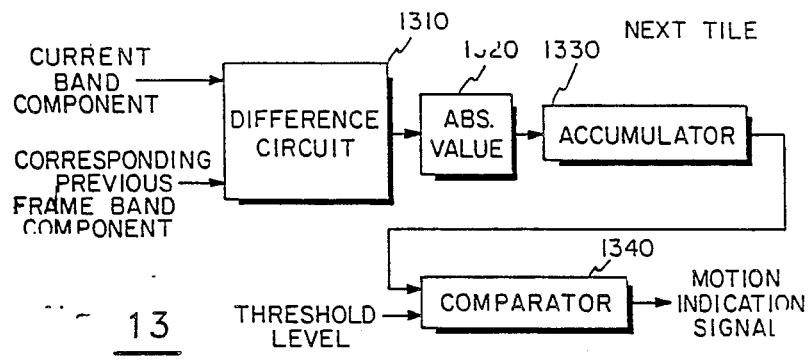
FIG. 13 is a block diagram of an embodiment of the motion detection circuit of FIG. 11.

The other band storage RAM 1155 may be single ported, and is used in this embodiment for the purpose of motion detection. The RAM 1155 receives the same coefficient information as the RAM 1150, but each time it receives a new coefficient, it reads out the corresponding coefficient from the previous frame (that is, the coefficient stored at the address to be occupied by the corresponding coefficient of the current frame), so that motion detection can be implemented by the circuit 1160, which is shown in further detail in FIG. 13. Referring momentarily to FIG. 13, the current band component (from transform chip 1120—FIG. 11), and the corresponding previous frame band component (from band storage RAM 1155—FIG. 11) are received by a difference circuit 1310 whose output is coupled to an absolute value circuit 1320. An accumulator 1330 accumulates the total of the absolute values of the differences for each tile (the resetting and read-out of the accumulator being enabled by a next tile indication), and its output is compared against a predetermined threshold level. If the threshold is exceeded, a motion indication signal is output from comparator 1340. As seen in FIG. 11, this signal is received by flag storage RAM 1170, which is also a dual ported RAM. In the present embodiment there are five motion flag statuses, as follows: motion flag status 1 indicates motion, and that the first of the four bands should be sent; motion flag status 2 indicates that there has been no motion for one frame, and that band 2 should be sent; motion flag status 3 indicates that there has been no motion for two frames, and that band 3 should be sent; motion flag 4 indicates that there has been no motion at the tile for three frames, and that band 4 should be sent; and motion flag status 0 indicates that there has been no motion at the tile for four or more frames, and that no spectral information should be sent (all four bands having already been sent). The tile control processor 1175, which may be any suitable microprocessor or part thereof, dedicated logic, or integrated circuit, controls the flag storage RAM 1170, as will be described. FIG. 12 is a flow diagram of a routine for controlling the tile control processor 1175. The block 1205 represents the initializing of indices i and j which represent the position of the tile in the two dimensional tile array. A sync code is then sent (block 1210), as indicated in FIG. 11 by an output of tile control processor to a sync code generator 1180 which outputs a sync signal to one input of an analog multiplexer 1195. The motion flag status for tile (i,j) is then sent to the fifo 1185 from the flag storage RAM 1170 via the multiplexer 1165, as represented by the block 1215. This is implemented by sending the address (i,j) to the output port of the flag storage RAM 1170, and enabling the multiplexer 1165 to pass the flag status information to the fifo 1185. Inquiry is then made (diamond 1220) as to whether the motion flag status is zero. If so, there has been no motion at this tile for at least the last four frames, and all of the band information has already been sent, so no spectral information will be sent for this tile. In such case, the diamond 1250 is entered directly. If the motion flag status is not zero, band information will be sent from the band storage RAM 1150 to the fifo 1185, and this is implemented by the loop 1243. An index k is initialized at zero, as represented by the block 1225. The index k is used to identify the five components of each band. Each time k is incremented (block 1240) the band component at the address [i,j,flag(i,j),k] is loaded from the band storage RAM 1150 into the fifo 1185 via the multiplexer 1165, the multiplexer being controlled to load information during this phase from the band storage RAM 1150 by the line in FIG. 11 labeled "select flag or band component". The address is seen to include the tile position [(i,j)], the motion flag status [flag (i,j)—which determines the band to be used, in accordance with the above-listed rules], and the component of the band [k]. When the loop 1243 is complete, the inquiry of diamond 1235 will be in the affirmative, and block 1245 will be entered, this block representing the updating of the motion flag status in accordance with the above-listed rules. Stated another way, the motion flag status at the address (i,j) is accessed in the flag storage RAM 1170 and is incremented modulo 5. Inquiry is then made (diamond 1250) as to whether the last tile of the row has been reached. If not, i is incremented (block 1260), block 1215 is re-entered, and the loop 1263 is continued until the row is complete. Index i is then initialized for the next row, and inquiry is then made (diamond 1255) as to whether the last row of tiles has been considered. If not, j is incremented (1270), block 1215 is re-entered, and the loop 1273 is continued until all tiles have been considered, whereupon the block 1205 is re-entered for processing of the tiles of the next frame.

The information in fifo 1185 is clocked out preferably at a fixed clock rate for a given portion of the transmitter frames, to digital-to-analog converter 1190, and then to transmitter via analog multiplexer 1195. The multiplexer 1195 is controlled to pass the output of digital-to-analog converter 1190, except when a sync code is being applied, as previously described.

Figure 14:
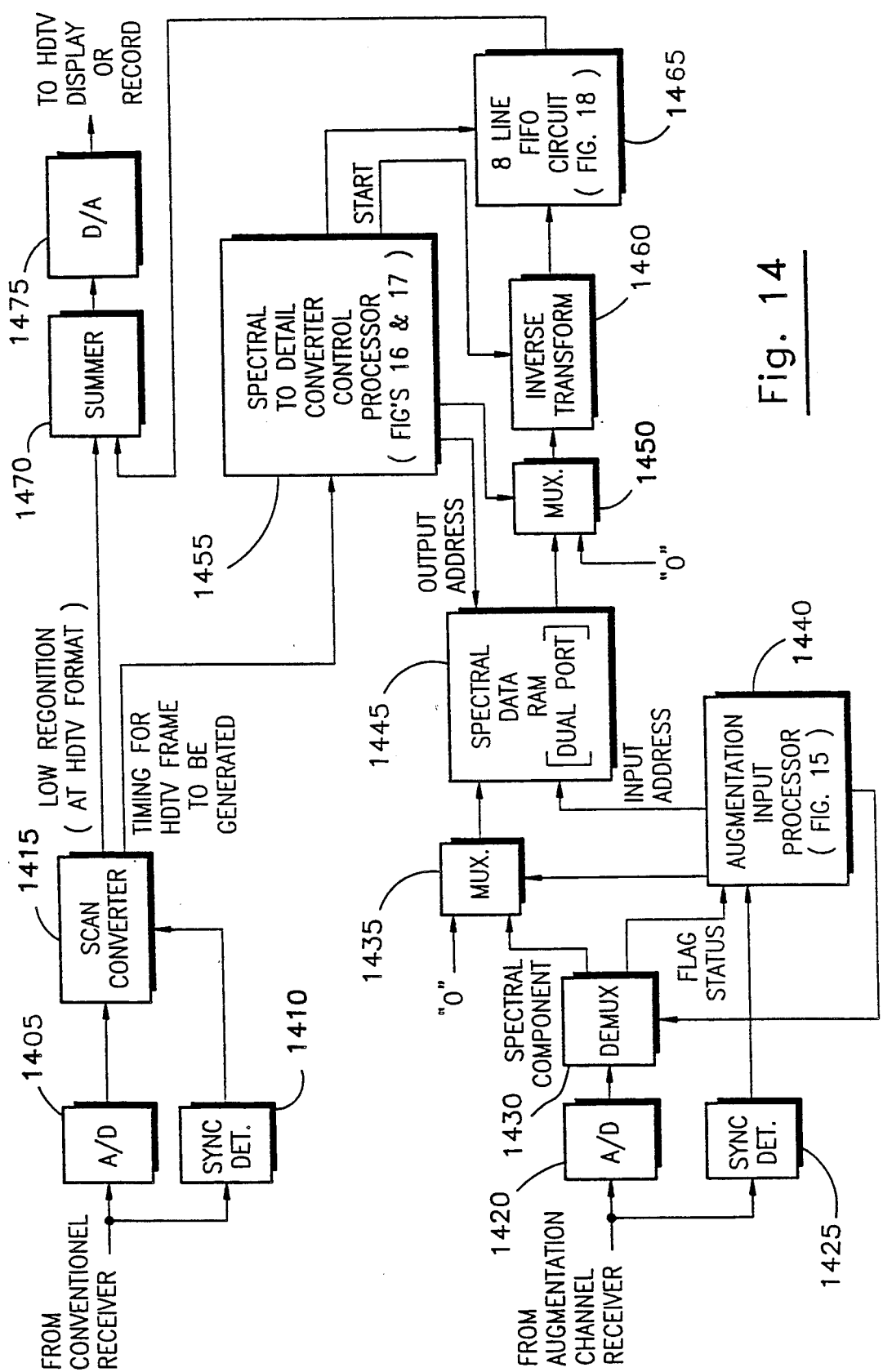
FIG. 14 is a block diagram of a decoder in accordance with an embodiment of the invention and which can be utilized to practice an embodiment of the disclosed decoding method.

Referring to FIG. 14, there is shown a block diagram of an embodiment of the decoder. In general, the decoder receives a conventional channel (e.g. 525 line input) and converts it to a relatively low resolution image at the same number of lines as the HDTV to be ultimately displayed or recorded. Information from the augmentation channel is received over a separate path, and is processed and stored in a spectral memory (block 1445 in FIG. 14). The output of the spectral memory is processed by an inverse transform chip (block 1460 in FIG. 14), for example an inverse cosine transform for the present embodiment, to obtain image detail which is added to the relatively low resolution scan-converted image obtained from the conventional resolution channel. This is implemented by the summer 1470 in the FIG. 14 embodiment. This signal is converted to analog form and can then be coupled to a suitable HDTV display and/or recording means.

It can be initially noted that the timing relationship between the conventional channel and the augmentation channel is non-critical, and can be treated independently. [This is because small delays between the low resolution components and the detail components will generally not be noticeable to the viewer.]

In the FIG. 14 decoder embodiment, an augmentation input processor 1440 and a spectral-to-detail converter control processor are employed. These functions can be implemented, for example, by sharing a single microprocessor or with separate microprocessors, or by dedicated logic or integrated circuit means. The routine for controlling the augmentation input processor is described in conjunction with the flow diagram of FIG. 15, and the routine for implementing the spectral-to-detail converter control processor is described in conjunction with the flow diagrams of FIGS. 16 and 17. The pixel stream output from the inverse transform chip 1460 is coupled to a fifo circuit 1465 which is described further in conjunction with FIG. 18.

Turning now to the detailed operation of the FIG. 14 embodiment, the video from the conventional receiver portion is coupled to an analog-to-digital converter 1405 and then to a scan converter 1415, the scan converter also receiving the necessary synchronizing information which is extracted by sync detector 1410 and is to be used by the scan converter 1415 and the spectral-to-detail converter control processor 1455.

The augmentation signal from the augmentation channel receiver portion is digitized using analog-to-digital converter 1420, and the augmentation sync is extracted (block 1425) and coupled to the augmentation input processor 1440 which, if in the middle of an operation, will asynchronously terminate the process in progress and return to the start of the frame sequence in order to re-synchronize. The digital data output from analog-to-digital 1420 is coupled, via a demultiplexer 1430, to the processor 1440 or to one input of a multiplexer 1435, the other input of which is a logical "0". As will be recalled, the data has a flag status indication followed, where appropriate, by spectral components, and the augmentation input processor 1440 operates to control the demultiplexer 1430 to couple motion flag status indications to the processor 1440 and spectral component data, via multiplexer 1435, to the dual ported spectral data RAM 1445.

Figure 15A:
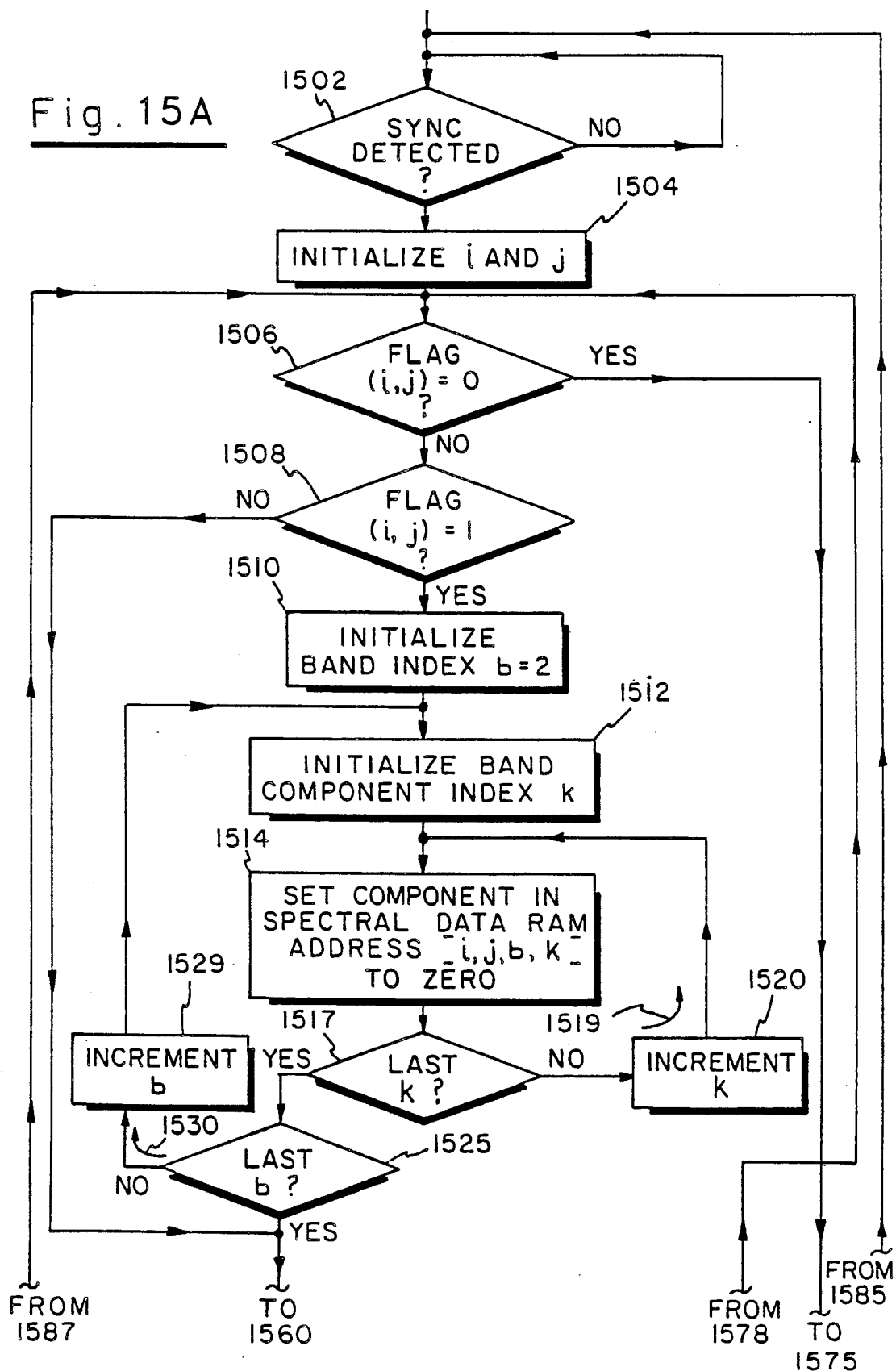
FIG. 15, which includes FIGS. 15A and 15B placed one below another, is a flow diagram of the routine for controlling the augmentation input processor of the FIG. 14 embodiment.
Figure 15B:
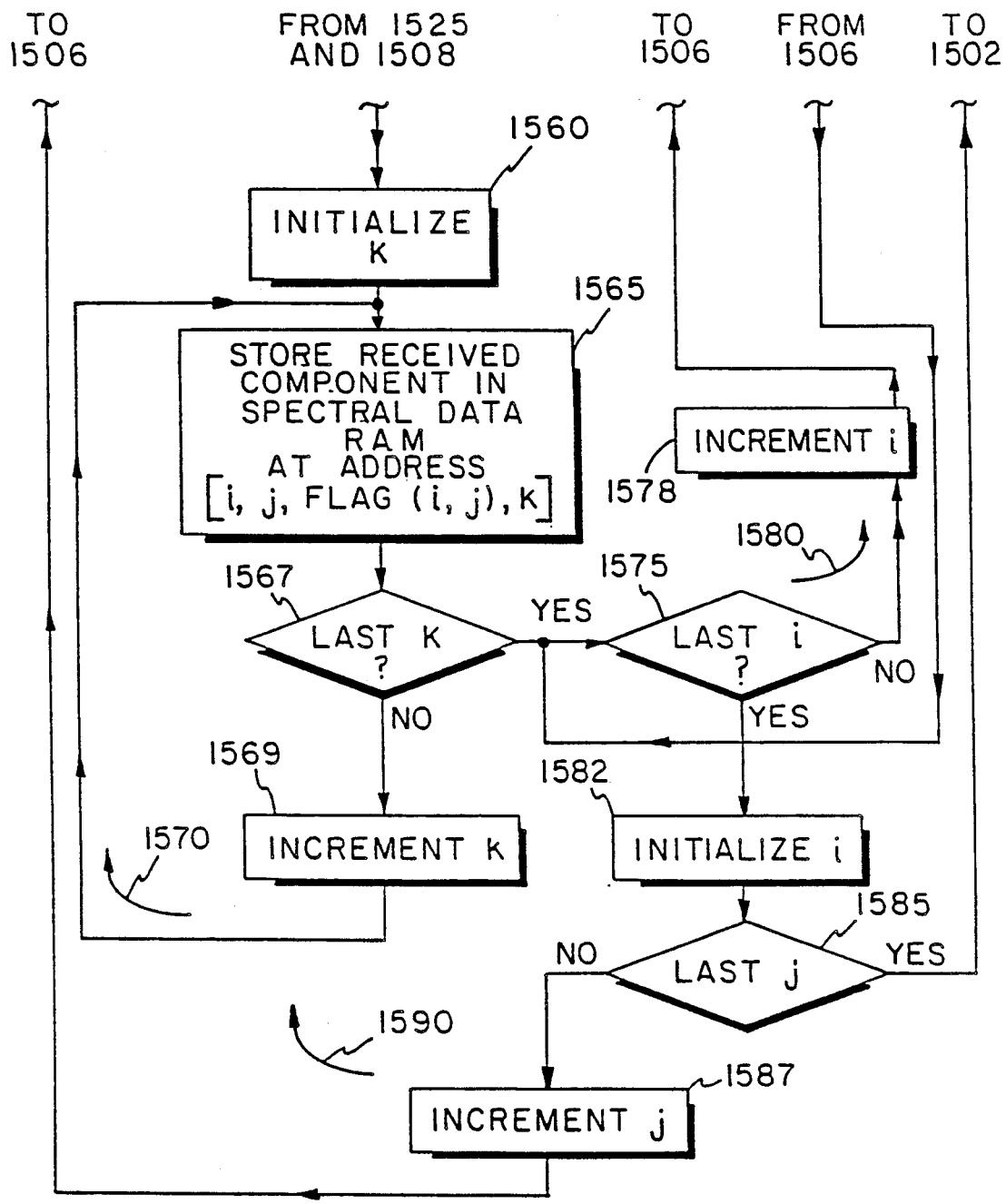
Figure 16:
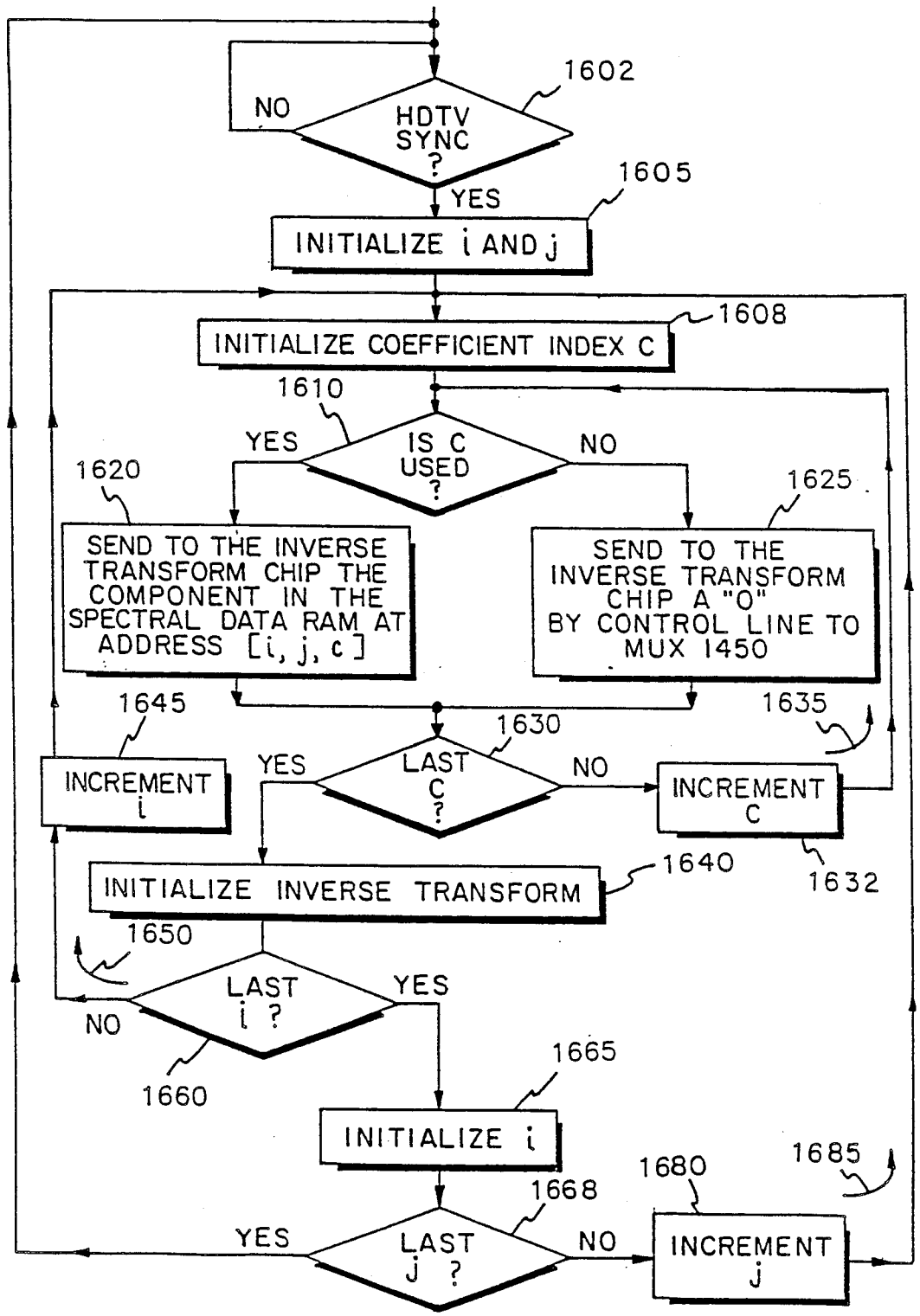
FIGS. 16 and 17 are flow diagrams of the routine for implementing the spectral-to-detail converter control processor of the FIG. 14 embodiment.

Reference can be made at this point to the flow diagram of FIG. 15 which illustrates a routine for controlling the augmentation input processor 1440. The diamond 1502, and the associated loop, represent the waiting for detection of sync, whereupon the tile position indices, i,j, are initialized block 1504). Inquiry is then made (diamond 1506) as to whether the motion flag status is 0. If so, no spectral data will follow the motion status flag, the next portion of the routine is bypassed, and the diamond 1575 is entered directly. If the flag status is not 0, inquiry is made (diamond 1508) as to whether the flag status is 1. If not, the block 1560 is entered directly. If so, however, motion at the current tile is indicated, and the high resolution bands in spectral data RAM 1445 therefore contain obsolete values. In such case, the next portion of the routine is utilized to remove these obsolete values from RAM 1445 and to insert a "0" via multiplexer 1435. In particular, the band index is initialized at 2 (block 1510), it being understood that it is not necessary to remove existing data from band 1 of storage, since the subsequent operation will cause insertion of new spectral data into band 1 (the motion flag status being 1 for this branch of the routine). The band component index k is then initialized (block 1512), and the block 1514 is entered, this block representing the setting of the component in spectral data RAM 1445, at address [i,j,b,k], to 0. Inquiry is then made (diamond 1517) as to whether the last k has been reached. If not, k is incremented (block 1520), block 1514 is re-entered, and the loop 1519 continues until all band components have been considered. Then, inquiry is made (diamond 1525) as to whether the last band has been reached. If not, the band index is incremented (block 1529), block 1512 is re-entered and the loop 1530 is continued until all bands have been considered. The block 1560 is then entered, and k is initialized. The received spectral component will then be stored in the spectral data RAM at address [i,j,flag(i,j),k], as represented by the block 1565. Inquiry is then made (diamond 1567) as to whether the last k has been reached. If not, k is incremented (block 1569), and the loop 1570 is continued until all components of the received spectral band have been read into their appropriate addresses in spectral data RAM 1445. The diamond 1575 is then entered (and is also entered directly from the "yes" output branch of diamond 1506), and inquiry is made as to whether last i [that is, the last tile of the row] has been reached. If not, i is incremented (block 1578), diamond 1506 is re-entered, and the loop 1580 is continued until the last i is reached. When this occurs, i is initialized to begin a new row (block 1582), and inquiry is made as to whether the last row has been reached (diamond 1585). If not, j is incremented (block 1587), diamond 1506 is re-entered, and the loop 1590 is continued until all tiles have been processed, whereupon the diamond 1502 is re-entered.

Referring again to FIG. 14, the spectral-to-detail converter control processor is synchronized to the output of scan converter 1415. When an indication of a start of frame is received by processor 1455, it begins the routine of controlling inputting of spectral data information from RAM 1445 to inverse transform chip 1460 via the multiplexer 1450. Referring, in this regard, to the flow diagram of FIG. 16, the sync is awaited (diamond 1602 and associated loop), and the tile indices are then initialized (block 1605). A coefficient index, c, is then initialized (block 1608), to consider all coefficients [for example, 64 coefficients for an 8×8 pixel tile] to be coupled, for each tile, to the inverse transform chip 1460. Inquiry is made (diamond 1610) as to whether c is used (it being recalled that only some of the coefficients are utilized). If not, a "0" is sent to the inverse transform chip 1460 by sending a command to the control line of multiplexer 1450. [Alternatively, if it is viable to permanently disable the not-used coefficients of inverse transform chip 1460, this operation would not be necessary.] If the coefficient is used, the block 1620 is entered, this block representing the sending to the inverse transform chip of the component in the spectral data RAM at address [i,j,c]. Inquiry is then made (diamond 1630) as to whether the last coefficient has been reached. If not, c is incremented (block 1632), diamond 1610 is re-entered, and the loop 1635 is continued until all coefficients have been read into the inverse transform chip 1460. When this has been done for the current tile, the inverse transform operation is initialized (block 1640, and the "start" line in FIG. 14). Inquiry is then made (diamond 1660) as to whether the last tile of the row has been reached. If not, i is incremented (block 1645), block 1608 is re-entered, and the loop 1650 is continued until the row is completed. The index i is then initialized for the next row (block 1665), and inquiry is made (diamond 1668) as to whether the last row has been processed. If not, j is incremented (block 1680), block 1608 is re-entered, and the loop 1685 is continued until all rows of tiles have been processed. The diamond 1602 is then re-entered to again await the sync.

Figure 17:
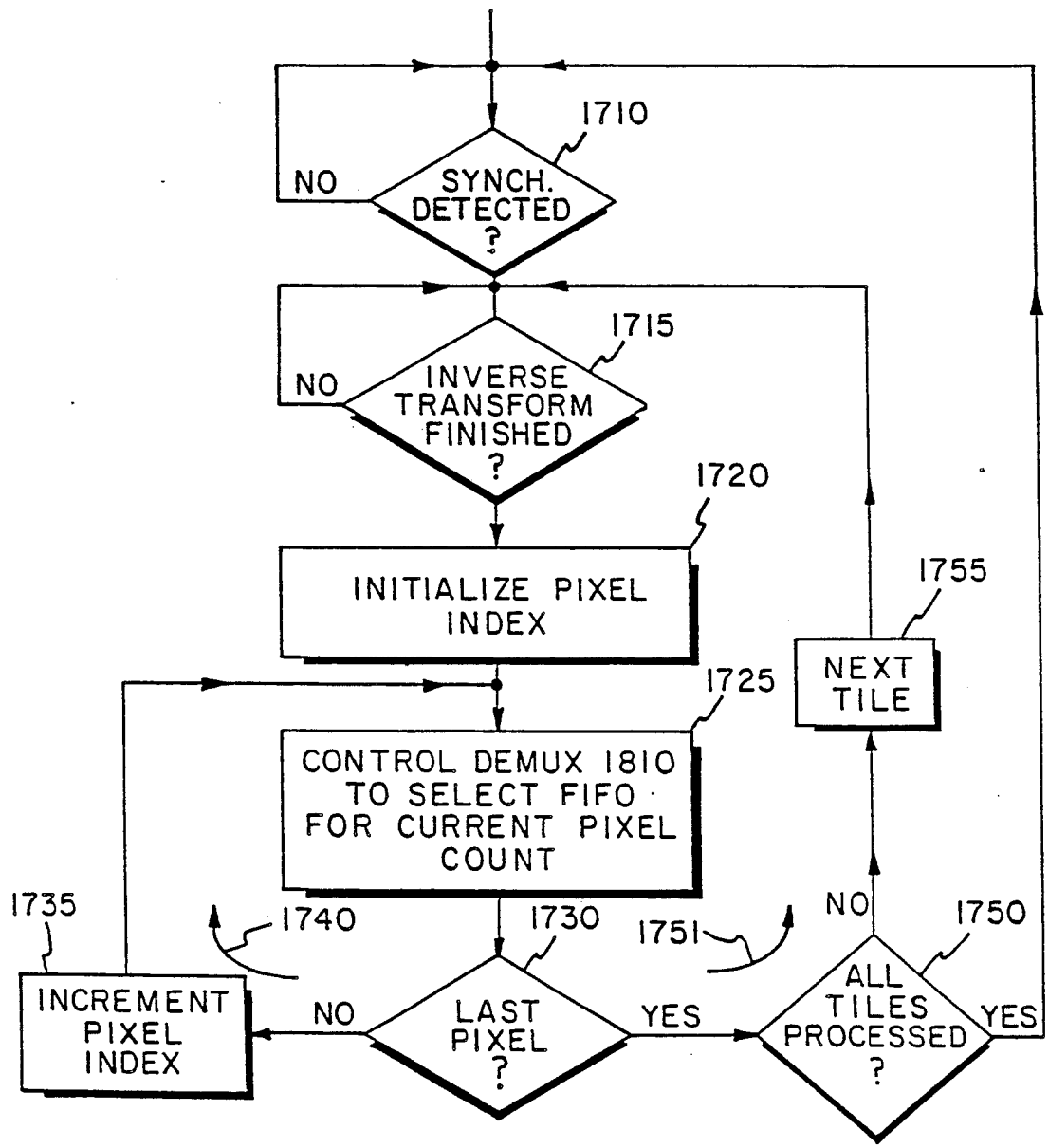

The routine illustrated by the flow diagram of FIG. 17 is used to control the loading of tiles of output pixel data into, and then out of, the fifo circuit 1465 of FIG.

Figure 18:
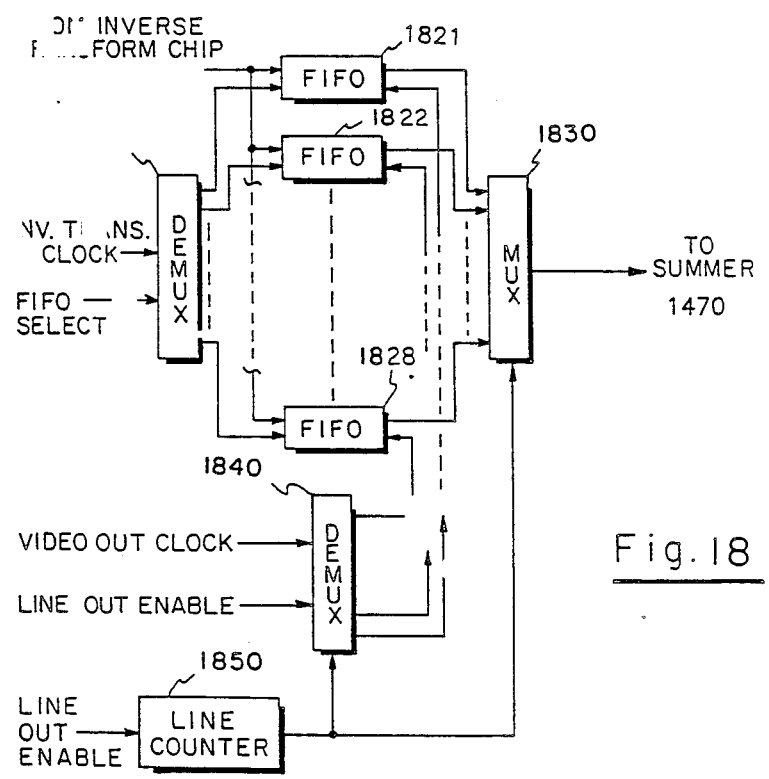
FIG. 18 is a block diagram of a fifo circuit utilized in the FIG. 14 embodiment.

14, the fifo circuit being shown in FIG. 18. In the present embodiment there are eight fifos, 1821–1828, and they each receive the inputs from the inverse transform chip 1460. However, only one fifo is enabled to load at a time, under control of demultiplexer 1810. The demultiplexer 1810 receives the inverse transform clock and a fifo select control from processor 1455. In particular, referring to the routine of FIG. 17, the diamond 1710, and the associated loop, represents the waiting for sync of the output video to be generated. The completion of the inverse transform computation for the current tile is then awaited (diamond 1715 and the associated loop), and a pixel index is initialized (block 1720). The demultiplexer 1810 is then controlled to select the fifo for the current pixel count (block 1725). Inquiry is then made (diamond 1730) as to whether the last pixel has been reached. If not, the pixel index is incremented (block 1735), the block 1725 is re-entered, and the loop 1740 continues until all pixels for the current tile have been read into the fifos. Inquiry is then made (diamond 1750) as to whether all tiles have been processed. If not, the tile index is incremented (block 1755), diamond 1715 is re-entered, and the loop 1751 continues until all tiles have been processed, whereupon the diamond 1710 is re-entered. The pixel information in the fifos is clocked out under control of demultiplexer 1840 which receives the video out clock and the line out enable, as seen in FIG. 18. The demultiplexer is controlled by the output of line counter 1850 which receives the line out enable, and, in the present embodiment, is a modulo 8 counter. The counter 1850 output also controls the multiplexer 1830 to select which fifo output is coupled to summer 1470 (FIG. 14), so that the information is read out a line at a time, after the 8×8 pixel data is read into the fifos 1821–1828.

The invention has been described with reference to a particular preferred embodiment, but variations within the spirit and scope of the invention will occur to those skilled in the art. For example, it will be understood that the techniques hereof are applicable regardless of the original resolution, and could be used to advantage for bandwidth compressing moving picture video information at any original bandwidth. It will also be understood that when a substantial portion of the scene is still (not in motion) for a substantial number of frame periods (e.g. more than five frame periods or 1/6 of a second), very little picture information will be transmitted [since, as noted above, most tiles will be status "0"]. In such case, the additional bandwidth could be used to periodically send update information. Also, statistical multiplexing among a number of channels of the type described could take particular advantage of the dynamic bandwidth characteristics of each channel.

I claim:

1. A method for encoding a video signal, comprising the steps of:
    dividing frames of the video signal into a multiplicity of tiles;
    separating the picture content of each tile into a plurality of frequency bands having a predetermined priority order;
    determining motion at each tile from changes in picture content of the tile from frame to frame; and
    generating signals for each frame that include an indication of the motion status for each tile and a representation of a frequency band for each tile, the frequency band representation for each particular tile being selected as a function of the motion status for said particular tile.

2. The method as defined by claim 1, wherein said plurality of frequency bands comprises at least three frequency bands.

3. The method as defined by claim 1, wherein said step of generating a signal that includes an indication of the motion status for each tile includes generating status signals that indicate, for each particular tile not exhibiting motion, the period for which said particular tile has not exhibited motion.

4. The method as defined by claim 2, wherein said step of generating a signal that includes an indication of the motion status for each tile includes generating status signals that indicate, for each particular tile not exhibiting motion, the period for which said particular tile has not exhibited motion.

5. The method as defined by claim 2, wherein different frequency band representations are selected for each motion status.

6. The method as defined by claim 4, wherein different frequency band representations are selected for each motion status.

7. The method as defined by claim 3, wherein one of said motion statuses results in selection of no frequency band representation for the tile having said one motion status.

8. The method as defined by claim 5, wherein one of said motion statuses results in selection of no frequency band representation for the tile having said one motion status.

9. The method as defined by claim 6, wherein one of sad motion statuses results in selection of no frequency band representation for the tile having said one motion status.

10. The method as defined by claim 1, wherein said step of separating the picture content of each tile on a frequency basis includes applying an orthogonal frequency transform to the picture content of each tile, and dividing the resultant coefficients into band groups.

11. The method as defined by claim 4, wherein said step of separating the picture content of each tile on a frequency basis includes applying an orthogonal frequency transform to the picture content of each tile, and dividing the resultant coefficients into band groups.

12. The method as defined by claim 5, wherein said step of separating the picture content of each tile on a frequency basis includes applying an orthogonal frequency transform to the picture content of each tile, and dividing the resultant coefficients into band groups.

13. The method as defined by claim 9, wherein said step of separating the picture content of each tile on a frequency basis includes applying an orthogonal frequency transform to the picture content of each tile, and dividing the resultant coefficients into band groups.

14. The method as defined by claim 10, further comprising the step of discarding coefficients representative of relatively high frequency diagonal frequency components of the picture information of each tile.

15. The method as defined by claim 11, further comprising the step of discarding coefficients representative of relatively high frequency diagonal frequency components of the picture information of each tile.

16. Apparatus for encoding a video signal, comprising:
    means for dividing frames of the video signal into a multiplicity of tiles;

means for separating the picture content of each tile into a plurality of frequency bands having a predetermined priority order;

means for determining motion at each tile from changes in picture content of the tile from frame to frame; and means for generating signals for each frame that include an indication of the motion status for each tile and a representation of a frequency band for each tile, the frequency band representation for each particular tile being selected as a function of the motion status for said particular tile.

17. Apparatus as defined by claim 16, wherein said plurality of frequency bands comprises at least three frequency bands.

18. Apparatus as defined by claim 16, wherein said means for generating a signal that includes an indication of the motion status for each tile includes means for generating status signals that indicate, for each particular tile not exhibiting motion, the period for which said particular tile has not exhibited motion.

19. Apparatus as defined by claim 17, wherein said means for generating a signal that includes an indication of the motion status for each tile includes means for generating status signals that indicate, for each particular tile not exhibiting motion, the period for which said particular tile has not exhibited motion.

20. Apparatus as defined by claim 16, wherein said means for separating the picture content of each tile on a frequency basis includes means for applying an orthogonal frequency transform to the picture content of each tile, and means for dividing the resultant coefficients into band groups.

21. Apparatus as defined by claim 19, wherein said means for separating the picture content of each tile on a frequency basis includes means for applying an orthogonal frequency transform to the picture content of each tile, and means for dividing the resultant coefficients into band groups.

22. A method for encoding a video signal, comprising the steps of:

separating said video signal into a relatively low resolution component and a relatively high resolution detail component;

dividing frames of the detail component into a multiplicity of tiles;

separating the picture content of each tile into a plurality of frequency bands having a predetermined priority order;

determining motion at each tile from changes in picture content of the tile from frame to frame; and generating signals for each frame that include an indication of the motion status for each tile and a representation of a frequency band for each tile, the frequency band representation for each particular tile being selected as a function of the motion status for said particular tile.

23. The method as defined by claim 22, wherein said plurality of frequency bands comprises at least three frequency bands.

24. The method as defined by claim 22, wherein said step of generating a signal that includes an indication of the motion status for each tile includes generating status signals that indicate, for each particular tile not exhibiting motion, the period for which said particular tile has not exhibited motion.

25. The method as defined by claim 24, wherein different frequency band representations are selected for each motion status.

26. For use in conjunction with a method for encoding a video signal, comprising the steps of: dividing frames of the video signal into a multiplicity of tiles; separating the picture content of each tile into a plurality of frequency bands having a predetermined priority order; determining motion at each tile from changes in picture content of the tile from frame to frame; and generating signals for each frame that include an indication of the motion status for each tile and a representation of a frequency band for each tile, the frequency band representation for each particular tile being selected as a function of the motion status for said particular tile; a decoding method comprising the steps of:

storing frequency band representations for each tile;

selecting stored frequency bands as a function of said motion status signals; and generating a decoded video signal from said selected stored frequency bands.

27. The method as defined by claim 26, wherein said plurality of frequency bands comprises at least three frequency bands.

28. The method as defined by claim 26, wherein said step of generating a signal that includes an indication of the motion status for each tile includes generating status signals that indicate, for each particular tile not exhibiting motion, the period for which said particular tile has not exhibited motion, and wherein said step of selecting stored frequency bands utilizes said indication of the period for which a tile has not exhibited motion.

29. The method as defined by claim 27, wherein said step of generating a signal that includes an indication of the motion status for each tile includes generating status signals that indicate, for each particular tile not exhibiting motion, the period for which said particular tile has not exhibited motion, and wherein said step of selecting stored frequency bands utilizes said indication of the period for which a tile has not exhibited motion.

* * * * *